United States Patent [19]
Howland et al.

[11] 3,853,362
[45] Dec. 10, 1974

[54] KINEMATIC BALL THRUST BEARING

[76] Inventors: Bradford Howland, 77 Massachusetts Ave., Cambridge, Mass. 02139; Howard C. Howland, 205 Winghn Dr., Ithaca, N.Y. 14850; Arthur T. Proll, 2 Avon Ave., Newburgport, Mass. 01950

[22] Filed: Apr. 5, 1972

[21] Appl. No.: 241,148

[52] U.S. Cl. ............................................. 308/230
[51] Int. Cl. ........................................... F16c 19/20
[58] Field of Search ...................... 308/200, 230, 183

[56] References Cited
FOREIGN PATENTS OR APPLICATIONS
205,106  12/1968  Germany ........................... 308/200

Primary Examiner—Manuel A. Antonakas
Assistant Examiner—Frank Susko
Attorney, Agent, or Firm—Killion & Larsen

[57] ABSTRACT

A novel thrust bearing is disclosed in which rotation is accompanied by a minimal axial motion by reason of the averaging in the defects over the number of balls making up the bearing. A first race is partially filled with about three-quarters of a full complement of balls. These balls are spaced apart by an equal number of balls. In one configuration, one of these races is made up of a pair of conical surfaces slightly eccentric relative to its axis of rotation, and the other race comprises a first conical surface substantially concentric with the axis of rotation and a second conical race having a degree of eccentricity which is adjustable by suitable centering means. The construction has no resistance to radial displacement or tilting and must be used in combination with radial bearings. Such an arrangement may be used for the introduction of controlled and very small amounts of cyclic axial motion between the elements.

15 Claims, 5 Drawing Figures

PATENTED DEC 10 1974 3,853,362

KINEMATIC BALL THRUST BEARING

This invention relates to bearings and particularly to a novel thrust bearing in which a pair of rows of balls work together to provide a bearing wherein the forces between elements are self-equalizing, that is, the device is kinematic.

The prior art is replete with examples of bearings in which balls or rollers are employed as spacers between load-bearing balls. German Pat. No. 205,106 to Fischer; British Pat. Nos. 27,268 of 1897 to Phillipe, and 18,383 of 1893 to Broadbent et al. and United States Pat. No. 366,117 to Lake are examples of this kind of bearing. U.S. Pat. Nos. 3,423,143 to Wietrzykowski; 943,570 to Schluss, and 665,653 to Faller, British Pat. No. 21,882 of 1901 to Dawson, and German Pat. No. 174,448 (1904) to Hofert, are examples of bearings in which rolling elements, either balls or rollers, space apart other rolling elements and are also load bearing. These bearings are to be distinguished from the present invention primarily in that they are radial bearings with only incidental capacity for axial loads. At the time of their inventions, these constructions were not contemplated to have particular precision capability and their proportions were not optimized to realize this property. In an earlier filed copending application, Ser. No. 161,854 filed July 12, 1971, two of us have described a kinematic thrust bearing employing a unique combination of balls and rollers. The present bearing is simpler to construct and assemble and has the added advantage that the configuration is tractable to analysis using a computer. In a conventional ball thrust bearing, an upper race and a lower race are separated by a single row of balls which may be spaced apart by a suitable retainer. With such a construction, irregularities in balls or races are communicated directly to the motion of the system. It is therefore an object of the invention to provide means for generating small compensatory motions in mechanical systems. It is a further feature of the design of the bearing in accordance with the invention that all contacts may be rolling contacts and the ball assembly is kept tight by the thrust load without backlash.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
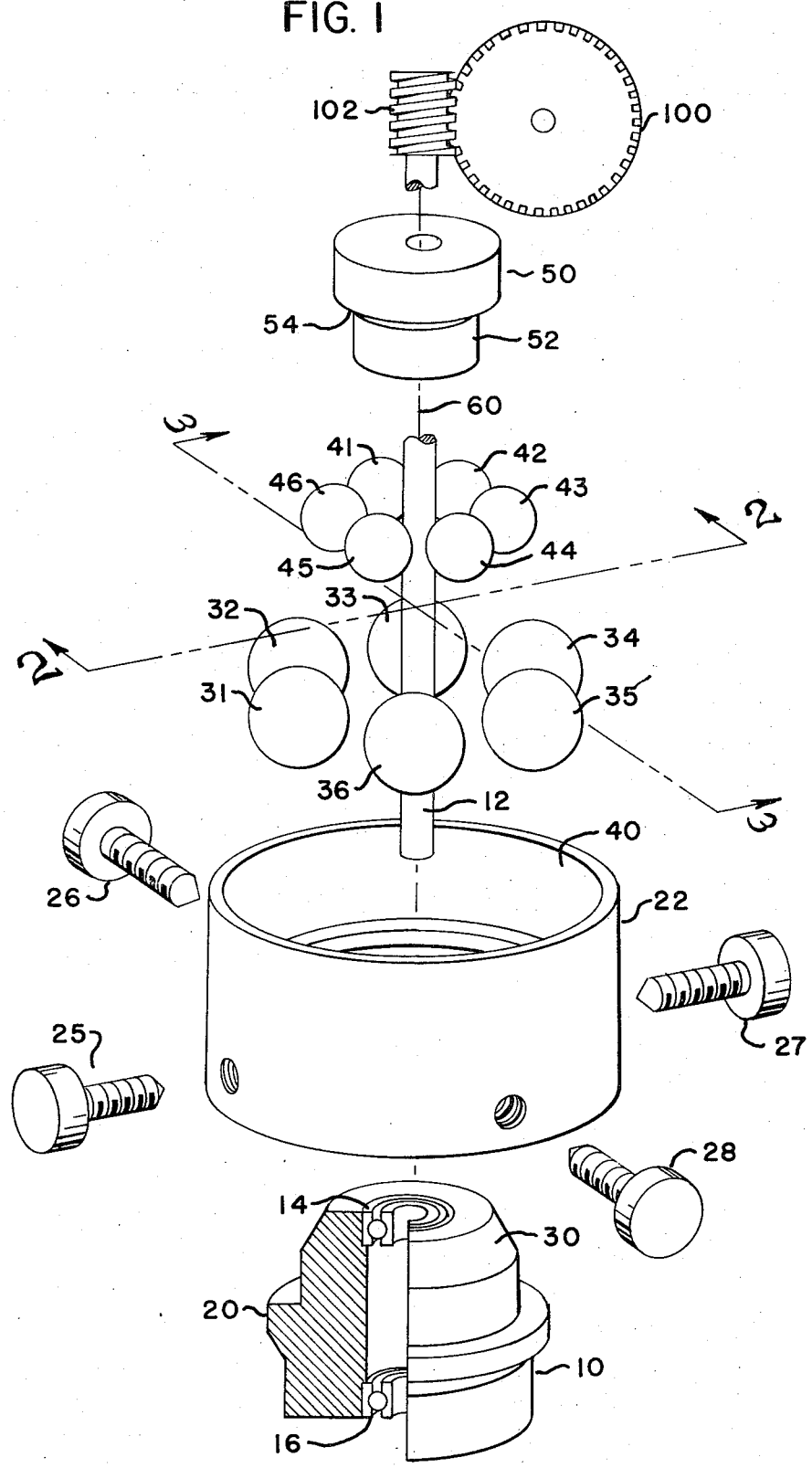
FIG. 1 is an exploded view partially in section of the preferred embodiment of the invention.

Referring now to FIG. 1, the bearing assembly is carried on a base 10 into which a shaft 12 is journaled on radial bearings 14 and 16. Resting on a collar 20 on the base 10 is the outer race section 22 which is retained to the base 19 by adjusting thumbscrews 25, 26, 27 and 28 by which any desired eccentricity may be introduced between the outer race ring 22 and the base 10 on which is formed the inner race surface 30. Six large balls 31–36 are spaced around the base 10 rolling on the inner surface 30 and the outer surface 40. Six smaller balls 41–46 spaced alternately between the larger balls roll against the upper race 50 contacting it on an inner portion 52 and an upper portion 54. The upper and lower races may be formed of conical portions as shown or have toroidal shapes of revolution a round the axis 60.

Figure 2:
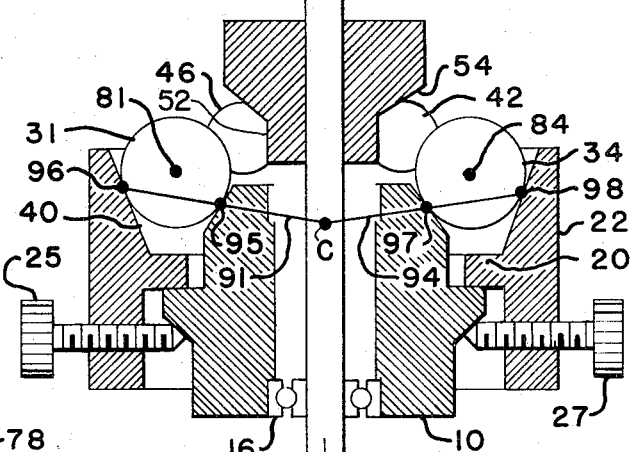
FIG. 2 is a sectional view of the assembly of FIG. 1 taken along line 2—2.
Figure 3:
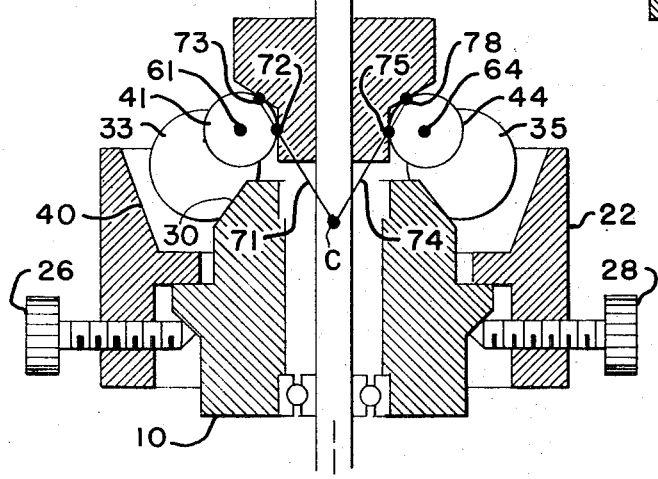
FIG. 3 is a sectional view of the assembly of FIG. 1 taken along line 3—3.

For stable rolling of the balls without sliding it is necessary that certain geometrical conditions be satisfied as is more clearly seen with reference to FIGS. 2 and 3. While the operation of the bearing requires that the balls move small distances from their idealized locations with no eccentricity or irregularity, such departures are neglected in these figures. The small balls 41–46 are assumed to be evenly spaced in a ring perpendicular to the axis 60. The centers 61 and 64 of the balls 41 and 44 respectively together with the axis 60 all lie in the plane of the section 22 which also contains the line 71 defined by the points 72 and 73 of contact of the ball 41 with the surfaces 52 and 54 respectively. This plane also contains the line 74 defined by the points of contact of the ball 44 with the surfaces 52 and 54 respectively. These lines 71 and 74 intersect at the point C on the axis 60.

In like manner the large balls 31–36 are evenly spaced between the small balls 41–46 and lie in a somewhat larger ring also perpendicular to the axis 60. The plane of the section 2—2, therefore cuts none of the small balls; and the plane 3—3 of the section of FIG. 3 cuts small balls 41 and 44 on diameters and does not cut any of the large balls.

The centers 81 and 84 of the balls 31 and 34 respectively, the axis 60, and the lines 91 and 94 defined respectively by the points of contact 95, 96, 97, and 98 of the balls 31 and 34 with the surfaces 30 and 40 of the lower race all lie in the plane of the section of FIG. 2; and the lines 91 and 94 also intersect at the point C. All of the set of twelve lines determined by the points of contact of each of the balls with its race all are designed to pass through the point C.

Because of the averaging effect a bearing of this kind has very little axial motion associated with rotation about the axis. By centering the lower race with the thumbscrews 25–28 the amount of vertical motion can be adjusted to practically zero. Conversely by decentering the lower race a small and almost purely sinusoidal axial motion is produced. The sine wave may be phased relative to the rotation of the axle depending upon the direction of the decentering introduced. This provides the means for introducing desired compensatory corrections in precision mechanisms.

In the embodiment of FIG. 1 a worm wheel 100 is driven by a worm 102 on the shaft 12. The rotation of the wheel 100 is proportional to the rotation of the worm 102 if the worm is perfectly centered; but if the worm is slightly eccentric, an error is introduced in the rotation of the wheel which is periodic with the rotation of the worm. By decentering the ring 22 an amount much larger than the small eccentricity, which amount may be accurately measured and controlled, a proportional, but much smaller axial motional correction may be introduced to compensate for the eccentricity of the worm.

Figure 4:
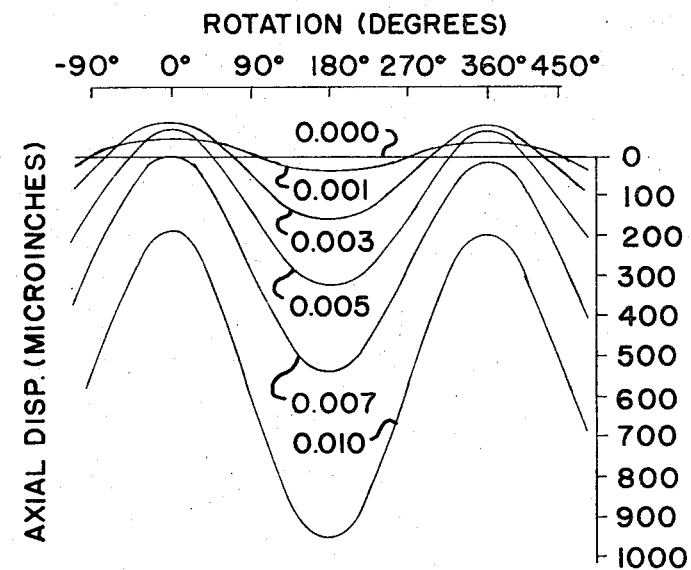
FIG. 4 is a graph illustrative of the operation of the apparatus of FIG. 1.

FIG. 4 is a graph obtained by computer simulation showing the variation in the available correction as a function of the amount of introduced eccentricity. The amount of induced axial motion is proportional to the product of the eccentricity of the upper race 50 multiplied by the eccentricity of the outer race ring 22. Thus if there is no eccentricity in either the upper or lower race, the arrangement, to the first order, cancels out the eccentricity.

The amount of axial displacement of the shaft 12 in microinches is shown for a fixed upper race eccentricity of 4 mils (0.004 inch) and various amounts of displacement d of the ring 22. The curves 0.000, 0.001, 0.003 0.005, 0.007 and 0.010 show the cyclic variation for corresponding displacements $d$ in inches from zero up to 10 mils. The peak-to-peak axial motion is proportional to the displacement $d$, and amounts to 760 microinches for the curve 0.010, the largest variation shown. Thus for a displacement $d$ of 10 mils a correction of less than 1 mil results, a reduction factor of about 15. Were the upper race eccentricity only 1 mil, instead of 4, the reduction factor would be 60. As the upper race eccentricity is made very small, the reduction factor can be made very large, so that accurately-controlled sinusoidal displacements of the order of microinches can be effected. For the example shown, the axial motion is sinusoidal with total harmonic distortion of 0.2 percent. The "noise" or random errors caused by random changes of phasing of the balls relative to the shaft amounts to less than $10^{-8}$ inches, for the example plotted in FIG. 4. The large balls are one-half inch in diameter, the small balls nine thirty-seconds inch in diameter.

For the computer simulation, the outer race surface 40 was modelled as a zone of the sphere which would provide the same contact track as the conical race illustrated in FIGS. 1–3. The race surfaces may be conical, spherical, or toroidal without substantially changing the performance of the bearing for small departures from the required geometry as above described.

The optimum design of a bearing in accordance with the invention requires the balancing of a great many factors, among them, the desired speed of rotation, the environment of shock and vibration, the required precision, desired life, load carrying capacity, etc.

A feature of the invention that is not immediately apparent from the drawings is that the balls as a group process around the axis 60 in the direction opposite to the rotation of the axle; at a rate depending upon the diameters of the balls and races and the vee angle, (the dihedral angle between the tangent planes at the two points of contact of a ball with its race) of each race. In the case of conical races as shown, the vee angle is the angle between the lines representing the race surfaces in the sectional drawings, FIGS. 2 and 3. At first glance it might appear that a near-optimum bearing might be produced with a very large number of balls and a relatively large race diameter to improve the effect of averaging. But such a design may be inoperative. For example, if the race and ball diameters and the vee angles are the same, it would require the balls to process at an infinite rate. As will be seen, other combinations can be selected which are similarly inoperative. To minimize the speed of ball precession, one race is selected to have a substantially smaller diameter, is fitted with smaller balls, and has a wider vee angle than the other. These features form a compatible combination in a structure substantially as shown.

The circles followed by the centers of the two sets of balls as they rotate lie on and define a cone, which is the "locus" of the centers of the balls. The apex angle (twice the angle between the generatrix and the axis) of the cone should be in the neighborhood of 90°. It may be zero in the special case when the races are of equal diameter; but in this case and others where it is too sharp, the balls move faster than is necessary if it is too large, if the cone is too flat, then the axial load is multiplied in producing excessive radial forces in the bearing. Also the races have to be about three-fourths filled with balls. Therefore the diameter of ball in each race should be about proportional to the diameter of the track the balls are to follow. If the balls are too far apart the axial load is multiplied into a bursting force. If the balls are too close together, the stiffness of the structure is diminished. Recalling the requirement that the lines 74 in FIG. 3 and 97 in FIG. 2 must each intersect at the same point C, it is next required to arrange the races so that the balls do not fly out. This requires that the outer surface 40 of the lower race be sufficiently vertical that there is a downward component of force on contacting balls. Similarly the surface 54 of the upper race must be sufficiently horizontal that the upper balls are held in.

These surfaces 54 and 40 sustain most of the force; but for stability there must be a portion of the load carried by the opposing surfaces 52 and 30 respectively. Usually from one-third to one-fourth of the load should be carried by these surfaces at rest, which is diminished by centrifugal force when the balls rotate.

The vee angles between the race surfaces 52 and 54 and 30 and race surface 40 are selected in the neighborhood of 120° and 60° respectively.

The operation of the bearing may be visualized as a competition between a ball in one race and a contacting ball in the other race to complete a circuit of their respective races. If the competition is a tie, then there is no relative motion between the races, representing an inoperative condition. In practice it may be convenient to cage the two sets of balls in a loose-fitting plastic cage impregnated with lubricant. It is convenient to relate the operation of the bearing to such a cage, real or imaginary. In a bearing designed in accordance with the invention, the balls rotate on axes which are fixed relative to the cage and meet at the point C. Each ball contacts two other balls and two conical race portions. These points of contact follow parallel circles on each ball, with the track made by contact between balls falling between the tracks made by the contacts of the ball with its race. A consideration of the factors governing the geometry of balls rolling in a conical race establishes that the radius of the inner track on a ball bears the same ratio to the radius of its track on the race as the radius of the outer track on the ball to the radius of the track on the race with which it is in contact.

If $R_{72}$ is the radius of the inner upper track made by point 72 on the inner surface 52 of upper race 50, $r_{72}$ is the radius of the track made by point 72 on the ball 41, $R_{73}$ is the radius of the outer upper track made by point 73 on the surface 54, $r_{73}$ is the radius of the track made by point 73 on the ball 41, $R_{95}$ is the radius of the inner lower track made by point 95 on the surface 30, $r_{95}$ is the radius of the track made by point 95 on the ball 31, $R_{96}$ is the radius of the outer lower track made by point 96 on the surface 40, $r_{31}$ is the radius of the track made by interball contact on the ball 31, and $r_{41}$ is the radius of the track made by interball contact on the ball 41;

A consideration of the geometry of a ball rolling in a conical race C establishes that $$r_{72}/R_{72} = r_{73}/R_{73}, \quad (1)$$

and $$r_{95}/R_{95} = r_{96}/R_{96} \quad (2)$$

The requirement that lines 71, 74, 91, and 94 meet at the common point C establishes that the contacts between the larger balls and the smaller balls will be a rolling (or rolling and spinning contact) without sliding due to lateral motion.

If $W_{31}$ is the angular velocity of ball 31 relative to the cage, $W_{41}$ is the angular velocity of ball 41 relative to the cage, and if $W_{10}$ is the angular velocity of the base relative to the cage, and $W_{12}$ is the angular velocity of the shaft relative to the cage, then:

$$W_{31}R_{31} = W_{41}r_{41} \quad (3)$$

because the surfaces of the balls move together at the same speed; and $$W_{12} = W_{41}r_{73}/R_{73} \quad (4)$$

$$W_{10} = W_{31}r_{96}/R_{96} \quad (5)$$

Substituting (3)

$$W_{12} = W_{31}\, r_{73}r_{31}/R_{73}r_{41} \quad (6)$$

so $$W_{10}/W_{12} = (r_{41}/73)(r_{96}/r_{31})(R_{73}/R_{96}) \quad (7)$$

When the fraction $W_{10}/W_{12}$ is unity, the races move at equal rates relative to the balls. Rotation of the shaft relative to the base is constrained; the device is inoperable as a bearing. When the fraction is close to unity, the balls move at a high rate compared to the output shaft. When the ratio is brought down to half, then the balls move in one direction at the same rate as the output shaft moves in the other.

If it were possible to make a bearing in which the contact tracks were perfect circles, this invention would lose much of its utility; but for purpose of exposition, it is convenient to regard the elements as circular or spherical, and as such to be measured by their respective radii.

It will also be understood that reference to "upper" and "lower" races is also primarily for imparting a better "feel" for the reality. Of course the bearing may be operated in any position. An element described in the specification or designated in a claim as "lower" may be found in actual apparatus alongside of or above a part designated as "upper." It would be possible for the smaller race to be fixed, with the larger to rotate. Thus, the important requirement is that the ratio $W_{10}/W_{12}$ differ from unity by a substantial factor, either multiplied or divided. Excessive ball speed in comparison to the relative speeds of the races may as well be limited when the ratio of equation (7) is two as when it is one-half, the factor being two.

Examining the factors of equation (7), it is seen that the first factor is a measure of the vee angle of the inner race 50 and is minimized by making the vee angle as large as possible; but it cannot be less than unity. The second factor is a measure of vee angle of the outer race and is minimized by making the vee angle as sharp as possible; and the third term is the ratio of inner-race diameter to outer race diameter. Geometry and the fact that friction rises steeply for small vee angles tend to limit the available range of these factors, so the design cannot depart radically from the embodiment shown.

Figure 5:
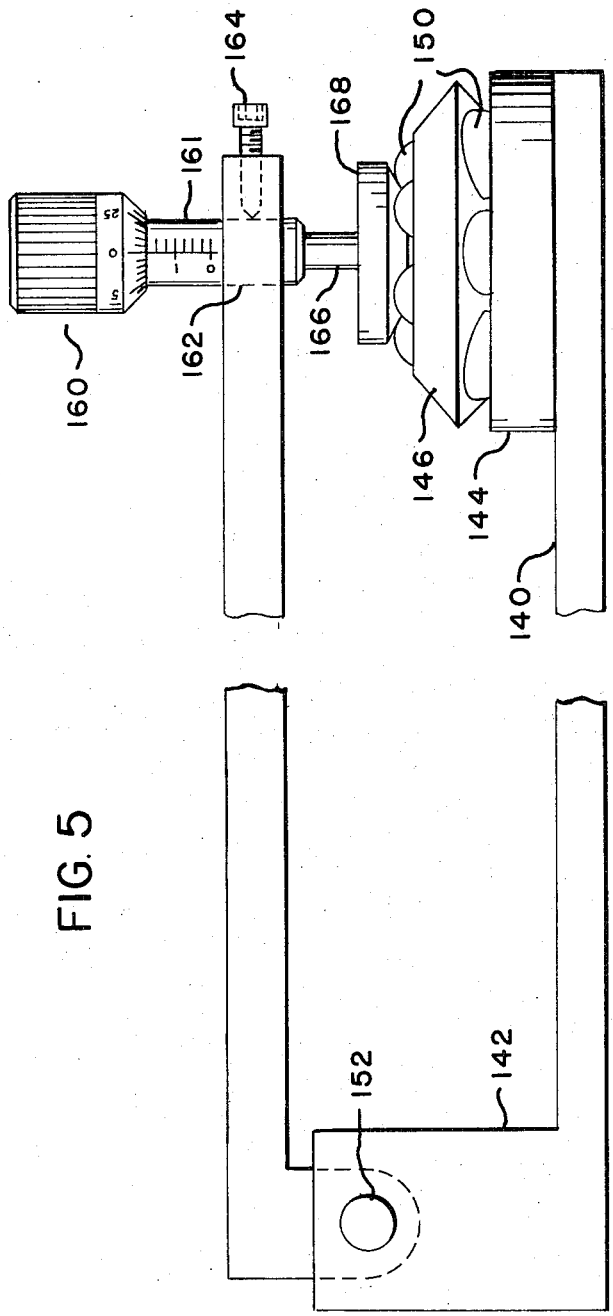
FIG. 5 is an alternative embodiment of the invention.

FIG. 5 illustrates an embodiment of the invention for use in a tilt table. Typically such a fixture is used to interpolate angles between those set up using a sine bar and so-called Johannson blocks. Only about ¼° of adjustment is needed; and for such a small angle the sine-equals-the-angle-equals-the-tangent approximation is good.

The fixture comprises a base 140 flat on the bottom and carrying a support 142 at one end and at the other end an outer race 144 and cage 146 of balls 150 in accordance with the invention. An upper plate, flat on top is carried on a hinge 152 connecting it to the support 142 and at the other end to a micrometer head 160. The body 161 of the micrometer head is held in a hole 162 by a set-screw 164 and the measuring end 166 of the micrometer screw carries an inner race 168 in accord with the invention which is coaxial with the screw. The upper plate which is the output member to which the desired angle is measured is constrained by the hinge to a single degree of freedom relative to the base 140. In the zero degree or design center position of the screw, the races are parallel and coaxial. As the output departs from the design center, the races depart from the parallel; but, because of the averaging, this does not introduce a significant departure from linearity. In the prior art, the screw is tipped by a carbide sphere or the like, and strikes against a flat anvil. This is satisfactory so long as there is no wear, scratch, or blemish in either. Using a bearing of the kind disclosed instead of a single ball effects averaging of errors and result in a system relatively insensitive to minor skewness or eccentricity of the elements.

It will be obvious that various modifications of the illustrative embodiments may be made without departing from the spirit of the invention. For convenience in construction and explanation, conical races have been employed. It will be understood that in a precision bearing the conditions never depart widely from the nominal, therefore the shapes of the elements away from the wear tracks, may depart from those shown.

It will be appreciated that there is a plane tangent to both balls at each point of ball-to-ball contact, and that these tangent planes under ideal conditions all meet at a point on the axis 60. If other design requirements permit, it is preferable that this point be the point C; and the proportions of the elements be adjusted to this end.

While a precision bearing of the type is not suggested in the prior art, similar arrangements of parts may have been known in the prior art. Accordingly claims are drawn to separate quantitatively the optimum proportions dictated by the present invention to distinguish from such prior structures, leaving to the public the teaching of the invention for the better enjoyment of the structures proportioned as known in the prior art.

It will thus be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

It will be seen that any even number of six or more balls may be used; but the geometry is unfavorable for designs calling for arrangements of less than 12 or more than about 40 balls.

The embodiments of the invention in which an exclusive property or privilege is claimed are defined as follows:

1. A kinematic thrust bearing comprising
   a. an upper race,
   b. a lower race,
   c. a first set, of number greater than three, of balls for said upper race, said balls being all of substantially the size measured by a first radius $r_{44}$, and
   d. a second set of said number of balls for said lower race, said second set of balls being all of substantially the size measured by a second radius $r_{34}$,
   e. said upper race, lower race, and ball sets being so proportioned that each of the balls of said first set contacts two balls of said second set and said upper race on two tracks of contact, an inner upper track, measured by a third radius $R_{72}$, and an outer upper track measured by a fourth radius $R_{73}$, each of the balls of said second set contacts two balls of said first set and said lower race on two tracks of contact, an inner lower track measured by a fifth radius $R_{95}$, and an outer lower track measured by a sixth radius $R_{96}$, and so that the cone which contains both said upper tracks has its apex at substantially the same point C as the apex of the cone which contains both said lower tracks, and further proportioned so that
   f. the cone which is the locus of the center of all said balls, has an apex angle less than 150°, the special case wherein the locus of said centers is a cylinder being included as for an apex angle of 0°.

2. A bearing as described by claim 1, wherein
   g. the tracks made by interball contact on each of the balls of said first set, are measured by a seventh radius $r_{41}$,
   h. the tracks made by interball contact on each of the balls of said second set, are measured by an eighth radius $r_{31}$,
   i. the tracks made on each of the balls of said first set by contact with said outer upper track are measured by a nineth radius $r_{73}$,
   j. the tracks made on each of the balls of said second set by contact with said outer lower track are measured by a 10th radius $r_{96}$ such that
   k. the product $(r_{41}/r_{73})(r_{96}/r_{31})(R_{73}/R_{96})$ obtained by multiplying together the ratio $(r_{41}/r_{73})$ of said seventh radius to said fourth radius, the ratio $(r_{96}/r_{31})$ of said 10th radius to said eighth radius, and the ratio $(R_{73}/R_{96})$ of said fourth radius to said sixth radius differs from unity by a substantial factor.

3. The bearing as defined by claim 2 wherein said factor is at least 1½.

4. The bearing as defined by claim 3 wherein said factor is at least two.

5. The bearing as defined by claim 2 wherein said factors is at least four.

6. The bearing as defined by claim 1 wherein
   g. said balls of said first set are smaller than those of said second set so that the ratio of said second radius to said first radius is at least 1¼,
   h. said upper race is smaller than said lower race so that the ratio of said sixth radius to said fourth radius is at least 1¼, and
   i. the apex angle of the cone which is the locus of the centers of all of said balls is less than 135°.

7. A bearing as defined by claim 2 wherein
   k. the vee angle of one of said races is greater than 100°, and
   l. the vee angle of the other of said races is less than 80°.

8. A bearing as defined by claim 1, in further combination with
   g. an output shaft fixed to rotate slightly eccentrically with said upper race,
   h. a base,
   i. radial bearing means to constrain said shaft to rotate on an output axis fixed relative to said base, and
   j. adjustable means for varying the alignment of said lower race about said axis by predetermined small amounts,
   k. whereby predetermined small cyclic axial movements accompany the rotary motion of said shaft.

9. A bearing as defined by claim 1, in further combination with,
   g. an output shaft fixed to rotate, coaxially with said upper race,
   h. a micrometer screw fixed to said shaft to rotate coaxially therewith;
   i. an output member carried on said screw to advance with the rotation thereof, constrained substantially to a single degree of freedom, and
   j. a base fixed to said lower race, and connected to said output member to maintain said lower race in alignment with said upper race at a design center position of said screw,
   k. whereby for small departures from said design center position the motion of said output member relative to said base progresses in almost perfect proportion with the angular rotation of said screw by averaging out imperfections in the parts of said bearing.

10. A bearing as defined by claim 6 wherein
j. the vee angle of said upper race is greater than 120°, and
k. the vee angle of said lower race is less than 80°.

11. A bearing as defined by claim 1 in further combination with
g. a pair of radial bearings to constrain said races to a coaxial alignment as one rotates with respect to the other.

12. A bearing as defined by claim 2,
l. in further combination with means to constrain said races to a coaxial alignment as one of said races rotates with respect to the other.

13. A bearing as defined by claim 4,
l. in further combination with means to constrain said races to a coaxial alignment as one of said races rotates with respect to the other.

14. A bearing as defined by claim 6
j. in further combination with means to constrain said races to a coaxial alignment as one of said races rotates with respect to the other.

15. A bearing as defined by claim 7
m. in further combination with means to constrain said races to a coaxial alignment as one of said races rotates with respect to the other.

* * * * *